United States Patent
Heyse

(10) Patent No.: US 11,544,909 B2
(45) Date of Patent: *Jan. 3, 2023

(54) SYNCHRONIZATION DEVICE FOR SYNCHRONIZING HEAD-MOUNTED DISPLAYS WITH A VIRTUAL WORLD IN AN AMUSE-MENT RIDE, AMUSEMENT RIDE HAVING A SYNCHRONIZATION DEVICE OF THIS TYPE, AND METHOD FOR OPERATING AN AMUSEMENT RIDE OF THIS TYPE

(71) Applicant: VR COASTER GMBH & CO. KG, Kaiserslautern (DE)

(72) Inventor: Michael Heyse, Mainz (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 66 days.

This patent is subject to a terminal disclaimer.

(21) Appl. No.: 16/978,867

(22) PCT Filed: Dec. 10, 2018

(86) PCT No.: PCT/EP2018/084228
§ 371 (c)(1),
(2) Date: Sep. 8, 2020

(87) PCT Pub. No.: WO2019/174770
PCT Pub. Date: Sep. 19, 2019

(65) Prior Publication Data
US 2022/0113541 A1    Apr. 14, 2022

(30) Foreign Application Priority Data

Mar. 16, 2018 (EP) .................... 18162346

(51) Int. Cl.
| | | |
|---|---|---|
| *G06T 19/00* | (2011.01) |
| *G02B 27/01* | (2006.01) |
| *G06F 3/01* | (2006.01) |

(52) U.S. Cl.
CPC ........ *G06T 19/006* (2013.01); *G02B 27/0172* (2013.01); *G02B 27/0179* (2013.01); *G06F 3/012* (2013.01); *G02B 2027/0187* (2013.01)

(58) Field of Classification Search
None
See application file for complete search history.

(56) References Cited

U.S. PATENT DOCUMENTS

| | | |
|---|---|---|
| 2017/0072316 A1 | 3/2017 | Finfter |
| 2017/0080349 A1 | 3/2017 | Reveley |
| 2018/0365896 A1 | 12/2018 | Jung |

FOREIGN PATENT DOCUMENTS

| | | |
|---|---|---|
| DE | 102015100943 A1 | 7/2016 |
| DE | 202017004917 U1 | 3/2018 |

(Continued)

OTHER PUBLICATIONS

Office Action dated Oct. 26, 2021, for corresponding Japanese application No. 2020-549562 (with English translation).

(Continued)

*Primary Examiner* — Jwalant Amin
(74) *Attorney, Agent, or Firm* — Nath, Goldberg & Meyer; Jerald L. Meyer; Stanley N. Protigal

(57) ABSTRACT

The invention relates to a synchronization device for synchronizing head-mounted displays (22) in an amusement ride (10), comprising at least one head-mounted display (22) with which a virtual reality generated by a VR device (30) can be displayed, and a display position detection device (28) for detecting the position and orientation of the head-mounted display (22), the synchronization device (12) being set up in such a way that the virtual reality is synchronized (Continued)

with the head-mounted display (22), taking into account the position and orientation of the head-mounted display (22) detected by the display position detection device (28), as soon as a selectable start criterion is met. Furthermore, the invention relates to an amusement ride having a synchronization device of this type. Furthermore, the invention relates to a method for operating an amusement ride of this type.

19 Claims, 2 Drawing Sheets

(56) References Cited

FOREIGN PATENT DOCUMENTS

| WO | 2017/155193 A1 | 9/2017 |
| WO | 2017153532 A1 | 9/2017 |

OTHER PUBLICATIONS

European search report dated Sep. 13, 2018 in corresponding EP application No. 18162346.3.

SYNCHRONIZATION DEVICE FOR SYNCHRONIZING HEAD-MOUNTED DISPLAYS WITH A VIRTUAL WORLD IN AN AMUSE-MENT RIDE, AMUSEMENT RIDE HAVING A SYNCHRONIZATION DEVICE OF THIS TYPE, AND METHOD FOR OPERATING AN AMUSEMENT RIDE OF THIS TYPE

CROSS-REFERENCE TO RELATED APPLICATIONS

This is a National Phase Application filed under 35 U.S.C. 371 as a national stage of PCT/EP2018/084228 filed Dec. 10, 2018, an application claiming the benefit of European Application No. 18162346.3 filed Mar. 16, 2018, the content of each of which is hereby incorporated by reference in its entirety.

FIELD

The present invention relates to a synchronization device for synchronizing head-mounted displays with a virtual world in an amusement ride. Furthermore, the invention relates to an amusement ride having a synchronization device of this type. Furthermore, the invention relates to a method for operating an amusement ride of this type.

BACKGROUND

In particular, due to the increasing processor performance of computers and the increasing amount of data that can be transmitted wirelessly, the concept of virtual reality (VR) can be transferred to more and more areas of application. A special area of application is amusement rides which make it possible to combine movements that take place in virtual reality with real movements in a particularly extensive way, which results in a particularly extensive immersion and a correspondingly intense ride experience for the passenger. Amusement rides of this type are known, for example, from EP 2 138 213 B1, JP 2001 062 154 A, U.S. Pat. No. 6,179,619 B1 and EP 3 041 591 B1.

In order to make the virtual reality accessible to the passenger, head-mounted displays such as VR glasses are typically used, which in many cases communicate wirelessly with VR devices that generate the virtual reality. However, it is also quite possible that the VR device is integrated in the head-mounted display. The head-mounted displays are usually issued at the amusement rides to the passengers before the start of the journey and collected again after the journey has ended. The issue and collection of the head-mounted displays takes place at a station in the amusement ride, where the passengers get in and get out of the vehicle. After the passengers have entered the vehicle, the head-mounted displays must be synchronized with the virtual reality so that the virtual reality matches the current position and the current orientation of the head-mounted display and satisfactory immersion is ensured. Since the passenger places the head-mounted display on his head, the position of the head-mounted display corresponds to the position of the passenger and the orientation of the head-mounted display corresponds to the orientation of the head of the passenger.

With known amusement rides, synchronization is carried out by letting the passenger look in a certain direction, usually in the direction of travel, and in doing so starting the representation of virtual reality on the head-mounted display. The position and orientation of the head-mounted display during synchronization are used as a reference. The representation of virtual reality depending on the position and the orientation of the head-mounted display during the journey therefore relates to the position and the orientation of the head-mounted display during synchronization. The more exactly the actual position and that assumed by the VR device when generating the virtual reality and the orientation of the head-mounted display match, the higher the immersion. For this purpose, the passengers should focus on a certain point during synchronization, with their head held in the direction of travel. The exact orientation of the head during synchronization is of crucial importance. In order to achieve this, an explanation or instruction by the personnel is usually necessary. However, incorrect operations cannot be ruled out, which means that several synchronizations have to be carried out. As a result, the synchronization is associated with an increased personnel and time effort.

It is therefore the problem of an embodiment and a design of the present invention to provide a remedy for the situation described above and in particular to create a synchronization device and an amusement ride with which a synchronization of a head-mounted display with virtual reality is made possible independently of the orientation of the passenger's head. In addition, a design of the invention is based on the object of providing a method which enables a head-mounted display to be synchronized with the virtual reality independently of the orientation of the head of the passenger.

SUMMARY

One embodiment of the invention relates to a synchronization device for synchronizing head-mounted displays in an amusement ride, comprising at least one head-mounted display with which a virtual reality generated by a VR device can be displayed, and a display position detection device for detecting the position and orientation of the head-mounted display, the synchronization device being set up in such a way that the virtual reality is synchronized with the head-mounted display, taking into account the position and orientation of the head-mounted display detected by the display position detection device, as soon as a selectable start criterion is met.

The display position detection device is able to determine the position and the orientation of the head-mounted display virtually continuously. As soon as the start criterion is met, the virtual reality is synchronized with the orientation and position of the head-mounted display. In the simplest case, the starting criterion is the commissioning of the head-mounted display. Consequently, the actual position and the position assumed in the generation of the virtual reality and the orientation of the head-mounted display match to a sufficient extent during synchronization. As soon as synchronization of the head-mounted display with the virtual reality has been carried out, the current position and the current orientation of the head-mounted display, and consequently that of the user, is related to the position and the orientation of the head-mounted display at the time of synchronization.

The orientation of the head-mounted display can be determined using components such as gyro, acceleration and/or magnetic sensors which are installed today in very large numbers, for example in smartphones.

Synchronization is independent of the orientation and position of the user's head. The immersion that can be achieved with the proposed synchronization device is reproducibly high. Since the user does not need to assist with synchronization, the synchronization can be carried out faster and without the risk of incorrect operation. Depending on the configuration, the synchronization device and/or the head-mounted display communicate in particular wirelessly with an external VR device, which generates the virtual reality, or the VR device is integrated in the head-mounted display.

According to a further embodiment, the display position detection device is set up in such a way that it defines a synchronization area and the start criterion is met when the head-mounted display is located within the synchronization area. As already mentioned, the display position detection device can detect the position and the orientation of the head-mounted display virtually continuously, starting with its commissioning. However, the computing power required for this, which must be provided by the display position detection device, is relatively high. In addition, it is not necessary to detect the position and orientation of the head-mounted display throughout the amusement ride. Rather, it is sufficient if this happens within a synchronization area that coincides, for example, with a station or an amusement ride. In this embodiment, the synchronization is carried out as soon as the passenger enters the synchronization area. In this embodiment, the synchronization device can be operated in an energy-efficient manner without disadvantages for the passenger or the immersion being impaired.

In a further developed embodiment, the head-mounted display can comprise a switching device, which generates a signal and sends it to the synchronization device when the passenger puts on the head-mounted display and the start criterion is met when the synchronization device receives this signal. The switching device can be, for example, a pressure switch that the passenger actuates when the head-mounted display is put on. Alternatively, the switching device can react to contact with the skin of the passenger. In this case the orientation and the position of the head-mounted display are also not detected continuously. In this case, the orientation and the position of the head-mounted display are only determined when the passenger puts on the head-mounted display. Only then is synchronization carried out, as a result of which the synchronization device can be operated in an energy-efficient manner without disadvantages for the passenger or the immersion being impaired.

In a further developed embodiment, the synchronization device can comprise a base station for storing the head-mounted display and the start criterion can then be met as soon as the display position detection device detects that the head-mounted display is removed from the base station. The base station can be used in amusement rides to store the head-mounted displays. As soon as the relevant head-mounted display has been removed from the base station, it can be assumed that the head-mounted display will be used by a passenger. Only then is synchronization carried out. Consequently, the synchronization device can also be operated in an energy-efficient manner in this embodiment without disadvantages for the passenger or the immersion being impaired.

In a further embodiment, the base station can have presence detection means with which it can be recognized whether the head-mounted display is stored in the base station and when the head-mounted display is removed from the base station. The display position detection device can also recognize that the head-mounted display is removed from the base station, but for this it must always be activated. The presence detection means can comprise, for example, a reed contact which switches when the head-mounted display is removed from the base station and thereby activates the synchronization device and the display position detection device. The synchronization device can therefore be operated in a more energy-efficient manner and with a smaller data volume.

A further developed embodiment is characterized in that the base station has a charging device for charging the head-mounted display. The charging device can be designed in such a way that when the head-mounted display is placed in the base station, contact is made with the voltage source. This ensures that the head-mounted display is always sufficiently charged without additional steps for charging the head-mounted display having to be carried out. The charging device can also be used as a presence detection means, since removal from the charging device can be detected and this information can be used as described.

In a further embodiment, the display position detection device is equipped with assignment means, which enable the head-mounted displays to be clearly assigned. The assignment means can be optical, for example, and allow a clear assignment during synchronization.

The individual head-mounted displays can also be assigned and synchronized via a time interval switch. This is possible, for example, if the head-mounted displays are switched on for a short interval. It is thus possible for the synchronization device to precisely recognize each head-mounted display and to determine the exact position in space for it, and to generate the correspondingly oriented virtual reality on the head-mounted display. Several virtual realities can be offered, between which passengers can choose. In order for the selected virtual reality to be displayed as selected, the head-mounted displays must be clearly assigned.

According to a further embodiment, the assignment means comprise markers arranged on the head-mounted display. The markers are used to implement so-called "outside-in-tracking", in which a position sensor is separate and arranged outside of the head-mounted displays. The position sensor can track the movement of the markers, which makes it easy to determine the position of the head-mounted display. Among other things, LEDs, transmitters based on Bluetooth Low Energy (BLE), also known as beacons, or QR codes, can be used as markers. In all cases, the markers can send a unique identification code to the display position detection device, so that the head-mounted displays can be clearly assigned. For example, the LEDs can be operated with a specific flashing pattern, which enables the relevant head-mounted display to be clearly identified. The flashing pattern can be designed so that it is perceived by the human eye as a permanent light.

A design of the invention relates to an amusement ride, in particular a roller coaster, comprising a route on which at least one vehicle is movably arranged, the vehicle being designed to accommodate at least one passenger, a VR device with which a virtual reality corresponding to a journey of the passenger with the vehicle along the route can be generated and can be represented on a head-mounted display assigned to the passenger, a vehicle position detection device for detecting the position of the vehicle on the route, and a synchronization device according to one of the preceding embodiments, which is set up in such a way that the virtual reality is synchronized with the head-mounted display, taking into account the position and orientation of the head-mounted display detected by the display position detection device and the position of the vehicle on the route, as soon as a selectable starting criterion is met.

The technical effects and advantages that can be achieved with the proposed amusement ride correspond to those that have been discussed for the present synchronization device. Due to the fact that the synchronization of the head-mounted display with the virtual reality is carried out independently of the behavior of the passenger, corresponding explanations and instructions can be omitted. Incorrect operation and renewed synchronization can be avoided, which means that the amusement ride can be operated at a higher throughput. In addition, personnel expenses decrease, so that the proposed amusement ride can be operated much more economically than conventional amusement rides of this type.

In a further developed design of the invention, it is envisaged that the vehicle has at least two passenger receptacles for accommodating one passenger each and that a head-mounted display is assigned to each passenger receptacle. In order to achieve a high level of immersion, the position of the head-mounted display, and consequently that of the passenger, in relation to the vehicle, must also be taken into account. In the case of long vehicles in particular, the passengers who are sitting in the first row pass through a certain section of the route earlier than passengers who are sitting in the last row. This time difference must be taken into account in the virtual realities shown for the respective passengers. Although the display position detection device can also determine the position of the display in relation to the vehicle, the assignment of a head-mounted display to a passenger receptacle has the advantage that this determination can be omitted. The computing power that must be performed by the display position detection device can be reduced.

In a further design the VR device can be set up in such a way that a virtual reality corresponding to the position and orientation of the head-mounted display outside the vehicle can be generated and displayed on the head-mounted display assigned to the passenger. In this design the virtual reality is not only limited to the route. Rather, the areas of the amusement ride adjacent to the route can also be integrated into the virtual reality. This increases the experience for the passenger and possible waiting times can be bridged in a fun way for the passenger. In addition, the virtual reality can be set up in such a way that a specific passenger who carries a specific head-mounted display is directed to a specific passenger receptacle. In some amusement rides, some passenger receptacles are not accessible to all passengers. For example, passengers with walking difficulties who need support when boarding and alighting and who are to be led to the station via ramps can be directed to a specific passenger receptacle with a correspondingly identified head-mounted display, where an employee of the amusement ride can assist the passenger.

One design of the invention relates to a method for operating, in particular, an amusement ride, such as a roller coaster, according to one of the designs discussed above, with a synchronization device according to one of the embodiments discussed above, comprising the following steps:

generating a virtual reality corresponding to a journey of a passenger with the vehicle along the route by means of a VR device,
detecting the position of the vehicle on the route by means of a vehicle position detection device,
detecting the position and orientation of the head-mounted display by means of a display position detection device,
displaying the virtual reality on a head-mounted display assigned to the passenger,
synchronizing the virtual reality with the position and the orientation of the head-mounted display as soon as a selectable start criterion is met, the virtual reality, taking into account the position of the vehicle on the route and the position and orientation of the head-mounted display, being displayed on the head-mounted display.

The technical effects and advantages that can be achieved with the proposed method correspond to those that have been discussed for the present amusement ride. Due to the fact that the synchronization of the head-mounted display with the virtual reality is carried out independently of the behavior of the passenger, corresponding explanations and instructions can be omitted. Incorrect operation and renewed synchronization can be avoided, which means that the amusement ride can be operated at a higher throughput. In addition, personnel expenses decrease, so that the proposed amusement ride can be operated much more economically than conventional amusement rides of this type.

At this point it should be pointed out that the present synchronization device and the proposed method can also be used independently of an amusement ride. The present synchronization device and the proposed method can be used in theme parks, fitness studios or escape rooms of leisure and games centers, as is shown, for example, in WO 2013/050473 A1.

In a further embodiment, the method can include the following steps:

defining a synchronization area by means of the display position detection device, and
synchronizing the virtual reality with the position and orientation of the head-mounted display when the head-mounted display is within the synchronization area, as a result of which the start criterion is met.

As already mentioned, the display position detection device can detect the position and the orientation of the head-mounted display virtually continuously, starting with its commissioning. However, the computing power required for this, which must be provided by the display position detection device, is relatively high. In addition, it is not necessary to detect the position and orientation of the head-mounted display throughout the amusement ride. Rather, it is sufficient if this happens within a synchronization area that coincides, for example, with a station or an amusement ride. In this embodiment, the synchronization is carried out as soon as the passenger enters the synchronization area. In this embodiment, the synchronization device can be operated in an energy-efficient manner without disadvantages for the passenger or the immersion being impaired.

In a further development, the method can include the following steps:

generating a signal by means of a switching device arranged on the head-mounted display when the passenger puts on the head-mounted display, and
sending this signal to the synchronization device, the start criterion being met when the synchronization device receives this signal.

The switching device can be, for example, a pressure switch that the passenger actuates when the head-mounted display is put on. Alternatively, the switching device can react to contact with the skin of the passenger. In this case the orientation and the position of the head-mounted display are also not detected continuously. In this case, the orientation and the position of the head-mounted display are only determined when the passenger puts on the head-mounted display. Only then is synchronization carried out, as a result of which the synchronization device can be operated in an energy-efficient manner without disadvantages for the passenger or the immersion being impaired.

In an advantageous design form, the synchronization device can also be located within the head-mounted display. However, it is also conceivable for the synchronization device to be located entirely outside the amusement ride, for example in a data center, or for example also to be integrated in a vehicle.

In a further development, the method can include the following steps:

displaying the virtual reality on the head-mounted display as soon as the vehicle position detection device detects that the vehicle is moving along the route, as a result of which the start criterion is met.

Although the display position detection device can also detect that the vehicle is moving along the route with the head-mounted display, the computing power to be performed for this by the display position detection device can be reduced if the movement of the vehicle along the route is detected by the vehicle position detection device. For this purpose, the vehicle position detection device can also use the start signal for the vehicle, which is output by the controller or by the operator of the amusement ride, for the start of the representation of the virtual reality.

In a further developed design, the method can include the following steps:

placing the head-mounted display on a base station, and synchronizing the virtual reality with the position and the orientation of the head-mounted display as soon as the display position detection device detects that the head-mounted display is removed from the base station, as a result of which the start criterion is met.

The base station can be used in amusement rides to store the head-mounted displays. As soon as the relevant head-mounted display has been removed from the base station, it can be assumed that the head-mounted display will be used by a passenger. Only then is synchronization carried out. Consequently, the synchronization device can also be operated in an energy-efficient manner in this embodiment without disadvantages for the passenger or the immersion being impaired.

BRIEF DESCRIPTION OF THE DRAWINGS

Exemplary embodiments of the invention are explained in more detail below with reference to the accompanying drawings. In the drawings.

DETAILED DESCRIPTION

Figure 1:
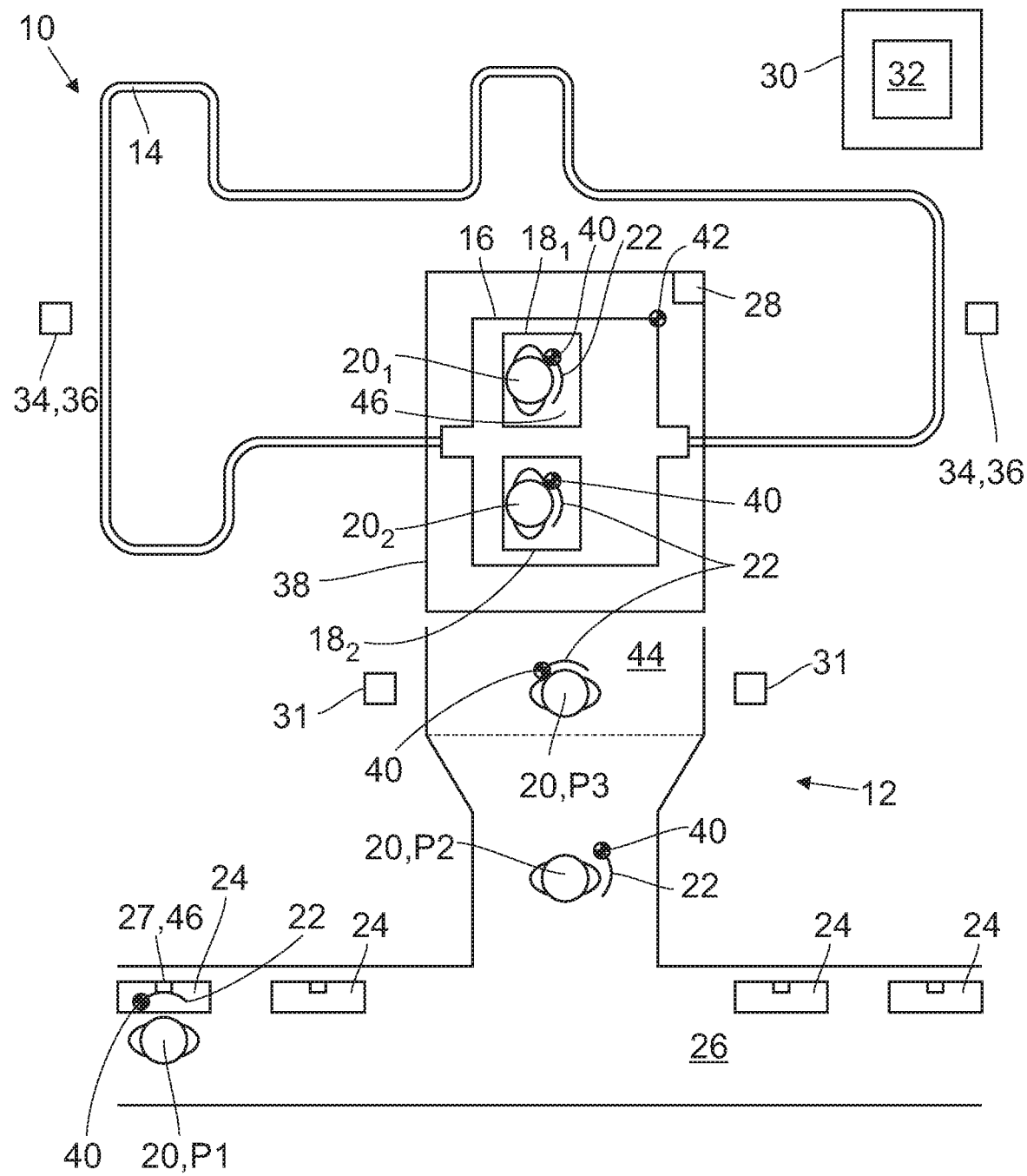
FIG. 1 shows an amusement ride with a first embodiment of a synchronization device according to the invention on the basis of a basic plan view.

FIG. 1 shows an amusement ride 10 with a synchronization device 12 according to the invention on the basis of a basic illustration. The amusement ride 10 comprises a route 14, along which a vehicle 16 can be moved by means of drive means, not illustrated. Of course, the amusement ride 10 can have more than one vehicle 16. In the illustrated embodiment example, the amusement ride 10 is a roller coaster. The vehicle 16 has a first passenger receptacle $18_1$ and a second passenger receptacle $18_2$, in which a first passenger $20_1$ and a second passenger $20_2$ can be accommodated, respectively.

The amusement ride 10 has a station 38 which is traversed by the route 14 and in which the vehicle 16 is stopped and started again. Passengers 20 can get into and out of the vehicle 16 at station 38.

The synchronization device 12 comprises at least one head-mounted display 22 with which a virtual reality can be displayed. Furthermore, the synchronization device 12 has a base station 24 for storing the head-mounted display 22. A base station 24 is provided for each head-mounted display 22 and is arranged in a waiting area 26 outside the station 38. The base stations 24 have a charging device 27, with which the head-mounted displays 22 can be charged as soon as they are stored in the base station 24.

Figure 2:
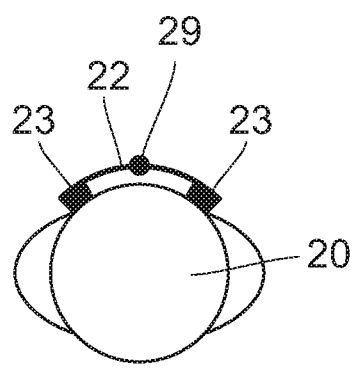
FIG. 2 shows a passenger wearing a head-mounted display, also based on a basic plan view.

In addition, the synchronization device 12 comprises a display position detection device 28, with which the position and the orientation of the head-mounted display 22 can be detected. As can be seen in particular from FIG. 2, the head-mounted display 22 has an assignment means 29 designed as a marker 29, which can be designed, for example, as an LED, a QR code or the like. As a result, each of the head-mounted displays 22 used in the amusement ride can be clearly identified and the position of the head-mounted displays 22 can be detected. In the exemplary embodiment shown, so-called "outside-in-tracking" is used, in which a number of position sensors 31 are separate and arranged outside of the head-mounted displays 22 (see FIG. 1). The position sensors 31 can track the movement of the markers 29, as a result of which the position of the head-mounted display 22 can be calculated.

Components such as gyro, acceleration and/or magnetic sensors installed in the head-mounted display 22, with which the orientation of the head-mounted display 22 can be determined, are not shown.

Furthermore, the head-mounted display 22 has a switching device 23, with which it can be detected whether the passenger 12 has put on the head-mounted display 22 or not.

The amusement ride 10 also includes a VR device 30, with which a virtual reality can be generated. For this purpose, the VR device 30 has a computing unit 32. The VR device 30 communicates wirelessly with the synchronization device 12 and the head-mounted display 22, which the passenger 20 wears much like glasses.

Furthermore, the amusement ride 10 is equipped with a vehicle position detection device 34, which is used to detect the position of the vehicle 16 on the route 14. The vehicle position detection device 34 has distance sensors 36, with which the position of the vehicle 16 on the route 14 is detected and transmitted to the computing unit 32, which takes the position of the vehicle 16 on the route 14 into account when generating the virtual reality.

The position and the orientation of the head-mounted display 22 can be described with a first coordinate system 40, while the movement and the orientation of the vehicle 16 can be described with a second coordinate system 42.

The amusement ride is operated in the following way: It can be seen in FIG. 1 that the head-mounted displays 22 are each stored in a base station 24. A passenger 20 in a first position P1 can take one of the head-mounted displays 22 from the base station 24 and then walk in the direction of the station 38. In doing so, he does not have to put on the head-mounted display 22, as is the case with the passenger 20 who is in a second position P2. In a third position P3, the passenger 20 has put on the head-mounted display 22. The third position P3 is located within a synchronization area 44.

As soon as the display position detection device 28 detects that the head-mounted display 22 is located within the synchronization area 44, the head-mounted display 22 is synchronized with the virtual reality generated by the VR device 30. At this time, the position and orientation of the head-mounted display 22 are set in relation to the position and orientation of the vehicle. In other words, the first coordinate system 40 and the second coordinate system 42 are set in a reference relationship to one another. Changes in the orientation and position of the vehicle 26 and the head-mounted display 22 are related to this reference ratio.

Alternatively, the base station can have a presence detection means 46, which detects whether the head-mounted display 22 is stored in the base station 24 or not. When it is removed from base station 24, this event can be used to start synchronization.

Depending on the design of the amusement ride 10, the virtual reality can be restricted to the route 14, so that this is only displayed when the passenger 20 has got into the vehicle 16 and a start signal for the vehicle 16 has been emitted. In this case, the passenger 20 is shown the real world in the head-mounted display 22 as long as he is outside the vehicle 16.

However, it is also possible that the virtual reality also includes the synchronization area 44, so that the passenger 20 is already being shown a virtual reality when he enters the synchronization area 44. In the case of virtual reality that goes beyond the vehicle, obstacles of the real world are represented in the virtual reality in such a way that they do not pose any danger to the passenger 20 who has put on the head-mounted display 22.

Figure 3:
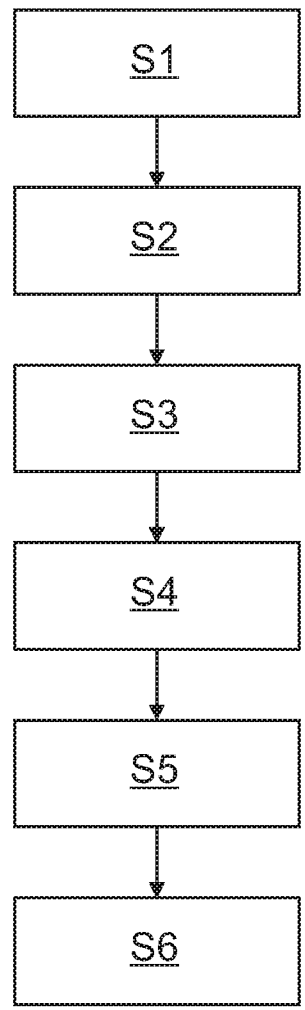
FIG. 3 is a flowchart showing the steps of an embodiment of a method according to the invention for operating an amusement ride.

FIG. 3 shows an embodiment of the method according to the invention for operating an amusement ride 10 using a flow chart. In this exemplary embodiment, the display position detection device 28 is activated when it is started up. In a first step S1, the display position detection device 28 detects the orientation and the position of the head-mounted display 22 in relation to the orientation and position of the vehicle when the head-mounted display 22 is located in the base station 24. In other words, the first coordinate system 40 and the second coordinate system 42 are defined at the time of the synchronization and set in a reference relationship to one another, which will not change until the next start-up. The passenger 20 then removes the head-mounted display 22 from the base station 24 in a second step S2. In a third step S3, the display position detection device 28 quasi-continuously detects the position and the orientation of the head-mounted display 22, so that the movement of the head-mounted display 22 can be recorded. In a fourth step S4, the passenger 20 puts on the head-mounted display 22, which is registered by the switching device 23. At this point in time, the orientation and position of the head-mounted display 22 are determined again in a fifth step S5, and after a sixth step S6 the virtual reality is displayed on the head-mounted display 22, taking into account the position of the vehicle on the route and the position and orientation of the head-mounted display 22.

LIST OF REFERENCE NUMERALS 10 amusement ride
12 synchronization device
14 route
16 vehicle
18 passenger receptacle
$18_1$ first passenger receptacle
$18_2$ second passenger receptacle
20 passenger
$20_1$ first passenger
$20_2$ second passenger
22 head-mounted display
23 switching device
24 base station
26 waiting area
27 charging device
28 display position detection device
29 assignment means, markers
30 VR device
31 position sensor
32 computing unit
34 vehicle position detection device
36 distance sensor
38 station
40 first coordinate system
42 second coordinate system
44 synchronization area
46 presence detection means
P position
S steps

The invention claimed is:

1. A synchronization device for synchronizing head-mounted displays (22) with a virtual world, comprising at least one head-mounted display (22) with which a virtual reality generated by a VR device (30) can be displayed;
   a display position detection device (28) for detecting the position and orientation of the head-mounted display (22);
   the synchronization device (12) being set up in such a way that the virtual reality is synchronized with the head-mounted display (22), taking into account the position and orientation of the head-mounted display (22) detected by the display position detection device (28), as soon as a selectable start criterion is met;
   and the synchronization device (12) comprising a base station (24) for storing the head-mounted display (22) and the start criterion is met as soon as the display position detection device (28) detects that the head-mounted display (22) is removed from the base station (24).

2. The synchronization device according to claim 1, characterized in that the display position detection device (28) is set up in such a way that it defines a synchronization area (44) and the start criterion is met when the head-mounted display (22) is located within the synchronization area (44).

3. The synchronization device according to claim 1, characterized in that the head-mounted display (22) comprises a switching device (23) which generates a signal and sends it to the synchronization device (12) when the passenger puts on the head-mounted display (22), and the start criterion is met when the synchronization device (12) receives this signal.

4. The synchronization device according to claim 1, characterized in that the base station (24) has presence detection means (46), with which it can be detected whether the head-mounted display (22) is stored in the base station (24) and when the head-mounted display (22) is removed from the base station (24).

5. The synchronization device according to claim 1, characterized in that the base station (24) has a charging device (27) for charging the head-mounted display (22).

6. The synchronization device according to claim 1, characterized in that the display position detection device is equipped with assignment means (29) which enable the head-mounted display to be clearly assigned.

7. The synchronization device according to claim 6, that the assignment means (29) comprise markers (29) arranged on the head-mounted display (22).

8. A method for operating an amusement (10), in particular a roller coaster, comprising:
   a route (14) on which at least one vehicle (16) is movably arranged, the vehicle (16) being designed to accommodate at least one passenger (20);
   a VR device (30), with which a virtual reality corresponding to a journey of the passenger (20) with the vehicle (16) along the route (14) can be generated and can be represented on a head-mounted display (22) assigned to the passenger (20);
   a vehicle position detection device (34) (38) for detecting the position of the vehicle (16) on the route (14); and
   a synchronization device (12) according to claim 1, which is set up in such a way that the virtual reality is synchronized with the head-mounted display (22), taking into account the position and orientation of the head-mounted display (22) detected by the display position detection device (28) and the position of the vehicle (16) on the route (14), as soon as a selectable start criterion is met, the method comprising the following steps:
   generating a virtual reality corresponding to a journey of a passenger (18) with the vehicle (16) along the route (14) by means of a VR device (30);
   detecting the position of the vehicle (16) on the route (14) by means of a vehicle position detection device (34);
   detecting the position and orientation of the head-mounted display (22) by means of a display position detection device (28);
   displaying the virtual reality on a head-mounted display (22) assigned to the passenger (20);
   synchronizing the virtual reality with the position and the orientation of the head-mounted display (22) as soon as a selectable start criterion is met, the virtual reality, taking into account the position of the vehicle (16) on the route (14) and the position and the orientation of the head-mounted display (22), being displayed on the head-mounted display (22);
   displaying the virtual reality on the head-mounted display (22) as soon as the vehicle position detection device (34) detects that the vehicle (16) is moving along the route (16), as a result of which the start criterion is met;
   placing the head-mounted display (22) on a base station (24); and
   synchronizing the virtual reality with the position and the orientation of the head-mounted display (22) as soon as the display position detection device (28) detects that the head-mounted display (22) is removed from the base station (24), as a result of which the start criterion is met.

9. The method according to claim 8, characterized in that the vehicle (16) has at least two passenger receptacles (18) for accommodating one passenger (20) each and that a head-mounted display (22) is assigned to each passenger receptacle (18).

10. The method according to claim 8, characterized in that the VR device (30) is set up in such a way that a virtual reality corresponding to the position and orientation of the head-mounted display (22) outside the vehicle (16) can be generated and displayed on the head-mounted display (22) assigned to the passenger (20).

11. The method according to claim 8, further comprising the following steps:
   defining a synchronization area (44) by means of the display position detection device (28), and
   synchronizing the virtual reality with the position and orientation of the head-mounted display (22) when the head-mounted display (22) is within the synchronization area (44), as a result of which the start criterion is met.

12. The method according to claim 8, further comprising the following steps:
   generating a signal by means of a switching device (23) arranged on the head-mounted display (22) when the passenger puts on the head-mounted display (22), and
   sending this signal to the synchronization device (12), the start criterion being met when the synchronization device (12) receives this signal.

13. A synchronization device for synchronizing head-mounted displays (22) with a virtual world in an amusement ride (10), comprising
   at least one head-mounted display (22) with which a virtual reality generated by a VR device (30) can be displayed;
   a display position detection device (28) for detecting the position and orientation of the head-mounted display (22);
   the synchronization device (12) being set up in such a way that the virtual reality is synchronized with the head-mounted display (22), taking into account the position and orientation of the head-mounted display (22) detected by the display position detection device (28), as soon as a selectable start criterion is met;
   and the synchronization device (12) comprising a base station (24) for storing the head-mounted display (22) and the start criterion is met as soon as the display position detection device (28) detects that the head-mounted display (22) is removed from the base station (24).

14. The synchronization device according to claim 13, characterized in that the display position detection device (28) is set up in such a way that it defines a synchronization area (44) and the start criterion is met when the head-mounted display (22) is located within the synchronization area (44).

15. The synchronization device according to claim 13, characterized in that the head-mounted display (22) comprises a switching device (23) which generates a signal and sends it to the synchronization device (12) when the passenger puts on the head-mounted display (22), and the start criterion is met when the synchronization device (12) receives this signal.

16. The synchronization device according to claim 13, characterized in that the base station (24) has presence detection means (46), with which it can be detected whether the head-mounted display (22) is stored in the base station (24) and when the head-mounted display (22) is removed from the base station (24).

17. The synchronization device according to claim 13, characterized in that the base station (24) has a charging device (27) for charging the head-mounted display (22).

18. The synchronization device according to claim 13, characterized in that the display position detection device is equipped with assignment means (29) which enable the head-mounted display to be clearly assigned.

19. The synchronization device according to claim 18, that the assignment means (29) comprise markers (29) arranged on the head-mounted display (22).

* * * * *